Theresa F. Klaschka
Inventor

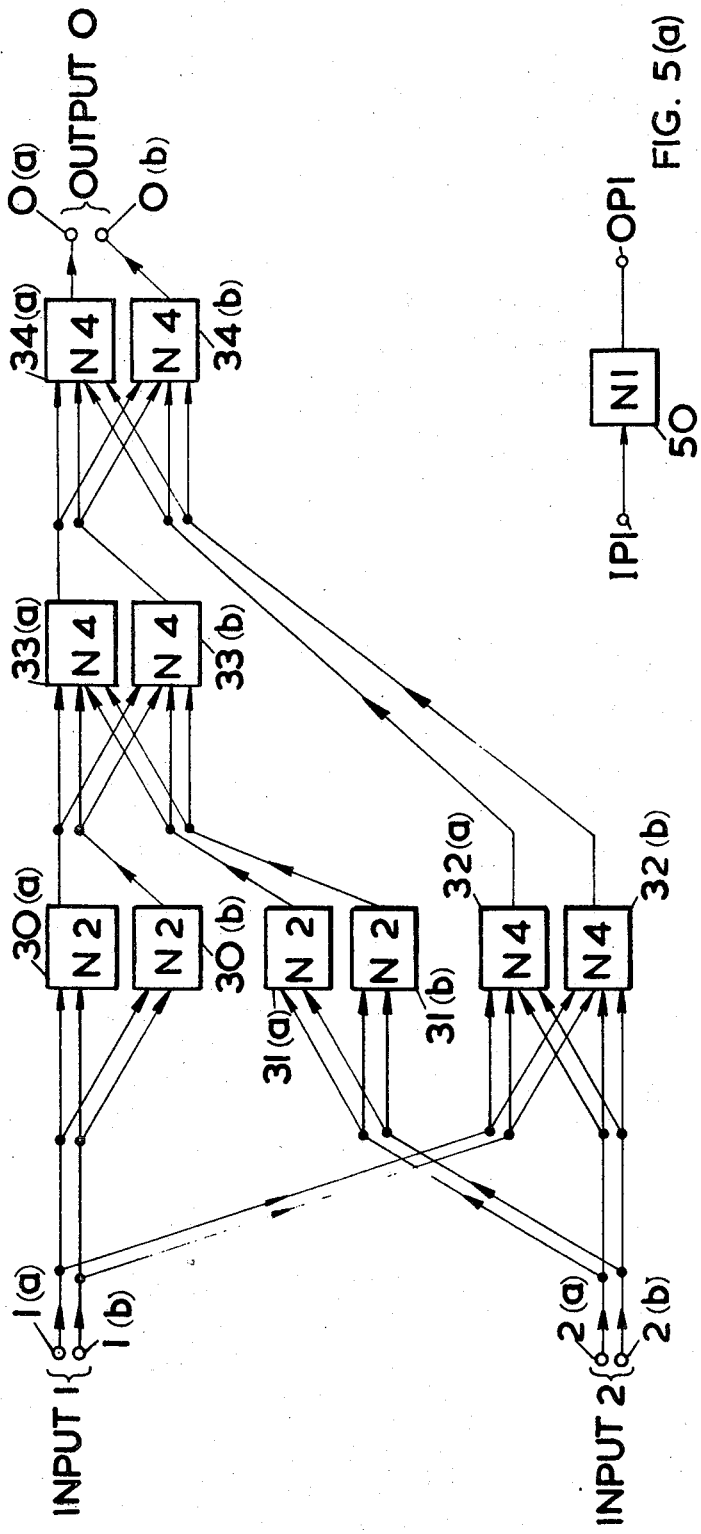
FIG. 3(b)
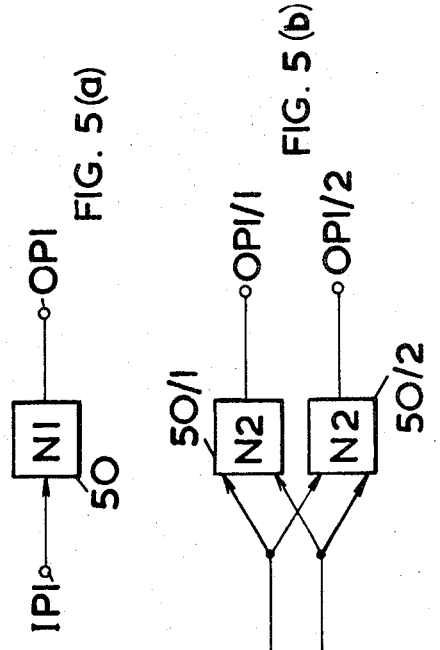
FIG. 5(a)
FIG. 5(b)

By
Hall, Pollock + Vande Sande
Attorneys

Nov. 24, 1970     T. F. KLASCHKA     3,543,048
REDUNDANT BINARY LOGIC CIRCUITS
Filed July 20, 1967     7 Sheets-Sheet 6

*Theresa F. Klaschka*
Inventor
By *Hall, Pollock & Vande Sande*
Attorney

# United States Patent Office 3,543,048
Patented Nov. 24, 1970

3,543,048
REDUNDANT BINARY LOGIC CIRCUITS
Theresa Farren Klaschka, Farnborough, England, assignor to Minister of Technology in Her Britannic Majesty's Government of the United Kingdom of Great Britain and Northern Ireland, London, England
Filed July 20, 1967, Ser. No. 658,303
Claims priority, application Great Britain, July 21, 1966, 32,771/66; May 10, 1967, 21,649/67
Int. Cl. H03k 19/08, 19/34
U.S. Cl. 307—204
24 Claims

ABSTRACT OF THE DISCLOSURE

Redundant binary logic circuits are formed with NOR-gates (or alternatively, NAND-gates) fed from replicate inputs, so that a comparatively high degree of reliability may be achieved by redundancies introduced in a compartively economical way. Each simple NOR function with $k$ inputs is performed by $r$ gates each having $k$ times $r$ inputs. Such systems of NOR gates tend to correct spurious zero signals, and the redundant components are arranged to make spurious one signals highly improbable. Corresponding systems of NAND-gates tend to correct spurious one signals and in these cases the redundancies are arranged to make spurious zero signals improbable. Examples including bistable circuits are given.

---

The present invention relates to redundant binary logic elements and complexes; that is to say, data processing elements responsive to binary signals and which employ extra components, in excess of those normally needed, in order to gain an improvement in reliability, and complexes or combinations thereof. It is, of course, desirable that the extra components should have a weight, volume, cost and power consumption which are as low as possible for a given improvement in reliability.

Data processing systems and computers are commonly designed and built as combinations of bistable devices and gates of various kinds. These are treated as elements; that is to say, a designer can treat them as building blocks and need not know the details of their internal structure. The gates used may include and-gates, or-gates, nand-gates and nor-gates, and may have any number of inputs. The term "redundant binary logic circuit" is used hereinafter to denote any redundant arrangement for replacing a simple bistable device or logical gate of any kind for use with binary signals. While the embodiments hereinafter described by way of example are electrical circuits, the invention is applicable to binary-logic elements in general, and embodiments operable by pneumatic or hydraulic signals would be feasible. The word "circuit" may therefore be taken as comprising hydraulic or pneumatic circuits and does not imply any limitation of the invention to those embodiments which are electrical circuits.

To assist in defining and explaining the invention, several other special terms will be employed, according to the following definitions:

The term "negatory gate" is used hereinafter to denote a binary-logic element which produces a first type of binary signal only when each and every one of its inputs is receiving the complementary or converse type of binary signal. A negatory gate may be classified either as a NAND-gate, which produces a zero signal output when and only when all of its inputs are receiving one signals, or alternatively as a NOR-gate, which produces a one signal output when and only when all of its inputs are receiving zero signals. It will be realised that the physical representations of a one signal and a zero signal may be the subject of an arbitrary choice, and that a NAND-gate from one system may be regarded as a NOR-gate in a system having an interchanged choice of physical representations. For instance, a NAND-gate from a system wherein one signals and zero signals are respectively represented by positive voltages and negative voltages, may be used unchanged as a NOR-gate in a system wherein one signals and zero signals are respectively respresented by negative voltages and positive voltages.

The phrase "replicates of a first input" is used hereinafter to denote a plurality of input channels or input connections which should carry identical signals when the whole of an apparatus, of which the logical means concerned forms a part, is functioning perfectly. The replicates may for instance be connections from similar or equivalent transducers, or connections from the outputs of any embodiment of the present invention; or alternatively they may be connected to a common source of acceptable reliability. The references to "replicates of the second input" should be similarly interpreted.

According to the present invention there is provided at least one redundant binary-logic circuit for achieving, with a redundancy of order $r$, where $r$ is a positive integer greater than unity, a logical effect corresponding to that of a non-redundant negatory gate having one output and $k$ separate inputs where $k$ is any positive integer; the said circuit comprising $r$ replicates of each of the said $k$ separate inputs, thus forming a total of $k$ times $r$ input connections, and $r$ negatory gates all of the same class, each having one output and $k$ times $r$ inputs, and each constructed to produce a first type of binary signal only when each and every one of its inputs receives the complementary type of binary signal, and constructed so that a fault or component failure within it may produce a false signal of one kind at its output but the chance of any single fault or failure within it causing a false signal of the converse kind at its output is remote or substantially nil, wherein the outputs of said $r$ negatory gates are sufficiently independent of each other to ensure that if a false signal is developed on any one of the said outputs, it will not be transmitted to any other one of the said outputs, and wherein each of the said $r$ negatory gates has its said $k$ times $r$ inputs separately connected to the said $k$ times $r$ replicate inputs. The circuit thus provides $r$ separate outputs, each representing (in the absence of any faults) the response of a simple negatory gate to the $k$ separate inputs. If there is no fault in the redundant circuit, these $r$ outputs will develop identical signals. The $r$ outputs may be connected as replicates of one input to a subsequent similar redundant circuit. The numerical value of $r$ is hereinafter refered to as the order of the redundant circuit.

The $r$ negatory gates of the same class may be NOR-gates. In this case the circuit is preferably made with redundant components arranged so that there are $r$ similar components (for instance, $r$ resistances or $r$ switch devices) connected in series in any part of the circuit where concurrent short-circuit failures of the $r$ similar components would produce a spurious one signal, and so that there are $r$ similar components connected in parallel in any part of the circuit where concurrent open-circuit failures of the $r$ similar components would produce a spurious one signal.

Alternatively, the $r$ negatory gates of the same class may be NAND-gates. In this case, the circuit is preferably made with redundant components arranged so that there are $r$ similar components (for instance $r$ resistances or $r$ switch devices) connected in series in any part of the circuit where concurrent short-circuit failures of the $r$ similar components would produce a spurious zero signal, and so that there are $r$ similar components connected in parallel in any part of the circuit where concurrent open-circuit failures of the $r$ similar components would produce a spurious zero signal.

In electrical embodiments of the invention, transistors may be used as switch devices and the resistances will be electrical. In hydraulic or pneumatic embodiments, fluid logic switching devices may be used, and the resistances may be passages or orifices which present a resistance to the flow of a working fluid.

The scope of the present invention also includes combinations of redundant circuits; for instance a combination for achieving the effect of a bistable logic element, in which, there are provided $r$ replicates of a first input, a first group of $r$ negatory gates, each of which has $r$ inputs connected to distinct ones of the $r$ replicates of the first input and has one output; and $r$ replicates of a second group of $r$ negatory gates, each of which has $r$ inputs connected to distinct ones of the $r$ replicates of the second input and has one output, $r$ feedback connections connecting the outputs of the first group of negatory gates to the replicates of the second input and $r$ feedback connections connecting the outputs of the second group of negatory gates to corresponding replicates of the first input, wherein $r$ is a positive integer greater than one.

In the design of any redundant logic circuit or any combination of logic circuits, the redundant components or circuits may be introduced in series or alternatively in parallel. The choice between series arrangements and parallel arrangements should be made according to the following principles.

Where the components or circuits are required to feed NOR-gates: Where an open-circuit in a component or circuit is liable to generate a spurious zero signal, while a short-circuit would tend to generate a spurious one signal, it should be replaced by two or more similar components or circuits in series, so that a single failure can cause only a spurious zero but cannot cause a spurious one.

Where a short-circuit in a component or circuit is liable to generate a spurious zero signal, while an open-circuit would tend to generate a spurious one signal, it should be replaced by two or more similar components or circuits in parallel, so that a single failure can cause only a spurious zero but cannot cause a spurious one.

Conversely, where the components or circuits are required to feed NAND-gates, the opposite arrangements should be applied to allow the generation of spurious one signals but prevent the generation of spurious zero signals by any single fault.

Advantages of the invention will now be explained and some embodiments of the invention described by way of example, with reference to the accompanying drawings, in which:

FIG. 1($a$) is a logical circuit diagram representing a two-input NOR gate,

FIG. 1($b$) is a logical circuit diagram of a redundant circuit of order two for achieving the same logical effect of the NOR gate shown in FIG. 1($a$), FIG. 2 is a circuit diagram of an electrical embodiment of a four-input NOR gate, FIG. 3($a$) is a non-redundant arrangement of NOR gates for achieving an exclusive OR function, FIG. 3($b$) is a logical circuit diagram of an arrangement of order two redundancy for achieving an exclusive OR function which may be used to replace the arrangement shown in FIG. 3($a$), FIG. 4 is a logical circuit diagram of a redundant arrangement of order three redundancy for achieving the same logical effect as the NOR gate shown in FIG. 1($a$), FIG. 5$a$ is a schematic diagram of a simple one-input negatory gate, FIG. 5$b$ is a schematic diagram of a redundant gate of redundancy $r=2$ for use in place of the simple gate of FIG. 5$a$, FIG. 6$a$ is a schematic diagram of a bistable element formed with two gates of the type represented in FIG. 5$a$, FIG. 6$b$ is a schematic diagram of a redundant bistable circuit of redundancy $r=2$, for use in place of the non-redundant bistable element of FIG. 6$a$, FIG. 6$c$ is a schematic diagram of a redundant bistable element of redundancy $r=3$, for use in place of the element of FIG. 6$a$ or the element of FIG. 6$b$, FIGS. 7$a$ and 7($b$) are circuit diagrams of electrical circuits which will be used hereinafter as examples of bistable elements of the kinds schematically represented in FIGS. 6$a$ and 6$b$ respectively, FIG. 8 is a circuit diagram of a simple non-redundant NOR gate circuit, FIG. 9$a$ is a circuit diagram of a known non-redundant bistable circuit formed of NOR-gates of the type shown in FIG. 8, and FIG. 9$b$ is a circuit diagram of a redundant form of the bistable circuit of FIG. 9$a$, of redundancy $r=2$.

In these drawings a negatory gate is represented by a box enclosing a letter N and a number representing the number of inputs to the gate, which is also equal to the threshold of the gate. Where corresponding parts appear in different drawings they are given identical or similar references wherever they occur.

FIG. 1($a$) shows a NOR gate 3 having two inputs 1 and 2 and one output 0. As is well known, such a NOR gate provides an output representing the binary digit one when, and only when, both of the inputs thereto represent a binary digit zero; otherwise it provides an output representing the binary digit zero.

FIG. 1($b$) shows a redundant circuit for achieving the same logical effect as the two-input NOR gate shown in FIG. 1($a$). This circuit has two four-input NOR gates 4 and 5 each having applied thereto two replicates 1($a$) and 1($b$) of the input 1, and two replicates 2($a$) and 2($b$) of the input 2. The replicate inputs 1($a$) and 1($b$) are, or should be identical (that is to say both represent the digit one or the digit zero according to the output of a previous circuit) and the same applies to the replicate inputs 2($a$) and 2($b$). All four inputs 1($a$), 1($b$), 2($a$), and 2($b$) are applied to each of the NOR gates 4 and 5 The NOR gates 4 and 5 yield outputs 0($a$) and 0($b$) which may be considered as two replicates of one output 0.

Incorrect signals occurring because of faults in a binary logical system can be of two kinds; they can be one signals occurring when a zero signal should be present (hereinafter called a $\emptyset$ fault), or they can be zero signals occurring when a one signal should be present (hereinafter called a $\emptyset$ fault). When a four-input NOR-gate such as the gate 4 (or the gate 5) has no faults within itself, but one of its inputs may be receiving an incorrect signal, its response will be in accordance with Table I:

TABLE I

|  | Inputs | | | | Output | |
| --- | --- | --- | --- | --- | --- | --- |
|  | 1$a$ | 1$b$ | 2$a$ | 2$b$ | Actual | Correct |
| No input faults | 1 | 1 | 1 | 1 | 0 | 0 |
|  | 1 | 1 | 0 | 0 | 0 | 0 |
|  | 0 | 0 | 1 | 1 | 0 | 0 |
|  | 0 | 0 | 0 | 0 | 1 | 1 |
| One $\emptyset$ input fault | 1 | $\emptyset$ | 1 | 1 | 0 | 0 |
|  | 1 | 1 | 1 | $\emptyset$ | 0 | 0 |
|  | 1 | $\emptyset$ | 0 | 0 | 0 | 0 |
|  | 0 | 0 | 1 | $\emptyset$ | 0 | 0 |
| One $I$ input fault | 1 | 1 | 0 | $I$ | 0 | 0 |
|  | 0 | $I$ | 1 | 1 | 0 | 0 |
|  | 0 | 0 | 0 | $I$ | $\emptyset$ | 1 |
|  | 0 | $I$ | 0 | 0 | $\emptyset$ | 1 |

Table I shows only the cases in which the inputs 1$b$ or 2$b$ are faulty; obviously faults on the inputs 1$a$ or 2$a$ would cause similar results. The main point to be noted is that a single incorrect $\emptyset$ input does not cause any error in the output; thus $\emptyset$ faults which occur singly are effectively corrected. Now, redundant components can be introduced into a system in series or parallel in such a way that $1$ faults become very improbable, at the cost of increasing the probability of occurrence of $\emptyset$ faults. This is advantageous in any part of a logical system which has to feed binary signals to NOR-gates, because of the correction of ∅ faults which is effected by redundant NOR-gates as described hereinabove, and it requires fewer extra components than an attempt to make all faults highly improbable.

It may be similarly shown that a four-input NAND-gate connected to duplicate inputs effectively corrects any $I$ faults which occur singly, so that in any part of a logical system which has to feed binary signals to NAND-gates the redundant components should be introduced so as to make the ∅ faults highly improbable.

By similar tables, it can be shown that more complicated NOR-gates with redundancy of order two also correct ∅ faults occurring singly, and NOR-gates with redundancy of order three and connected to triplicate inputs correct ∅ faults occurring one at a time or two at a time among its input signals. Redundant NAND-gates behave in this way with respect to $I$ faults. These arguments may be extended to the consideration of gates of any order of redundancy $r$ greater than two.

Thus, negatory gates connected to replicate inputs are the basic elements of combinations which are embodiments of the present invention; the detailed structure of the gates, and the interconnections between the gates, are chosen with regard to the principles stated hereinabove concerning the choice of series or parallel connections.

In the arrangement of FIG. 1(b) it is assumed that two replicates of the output will be required to feed a further redundant circuit; this is the reason for the inclusion of the gate 5. From the symmetry of the arrangement it is obvious that the outputs 0(a) and 0(b) will be replicate outputs. Using Table I it can be verified that the arrangement of FIG. 1(b) in fact achieves the logical effect of the simple NOR-gate of FIG. 1(a) in a redundant manner.

FIG. 2 is a circuit diagram of a preferred form of an electronic four-input NOR-gate for use in a system with redundancy of order two, in which one signals and zero signals are respectively represented by a positive voltage and a voltage near ground potential. FIG. 2 shows four npn transistors T1, T2, T3 and T4 having their emitters connected to a common terminal 0, which is grounded. The collectors of the transistors T1 to T4 are connected to a common output and through resistors R1a and R1b in series to a source of positive voltage. Inputs 1(a), 1(b), 2(a) and 2(b) are connected to the bases of the transistors T1, T2, T3 and T4 through resistors R2, R3, R4, and R5 respectively.

The operation of the circuit shown in FIG. 2 is as follows. If a positive voltage representing a one signal is applied to one or more of the inputs 1(a), 1(b), 2(a), and 2(b), the associated one or more of the transistors T1 to T4 will conduct fully so that the circuit output will be at the voltage of the common terminal 0. Thus the voltage at the output will represent a zero signal as is required. If, however, a voltage near ground potential representing a zero signal is applied to each of the inputs 1(a), 1(b), 2(a), and 2(b) so as to cut off all of the transistors T1 to T4, the output voltage will represent a one signal because the resistors R1a and R1b will carry no current. Again, this is the required result.

From inspection of the circuit shown in FIG. 2, it will be seen that any single transistor fault will either not affect the operation of the circuit when connected into a logical circuit such as that shown in FIG. 1(b), or will cause the output of the NOR-gate to represent a zero signal. An open circuit failure of one of the resistors R2 to R5 has the same effect as if the corresponding transistor failed to conduct and as if a voltage representing a zero signal were applied to the corresponding input. This, by itself, will have no effect on the output of the NOR-gate. An open circuit failure of either of the resistors R1a and R1b will cause the output of the NOR-gate to represent a spurious zero signal. This, by itself, should not affect the operation of subsequent redundant NOR-gates.

Resistors can be made so that they are very unlikely to develop a short-circuit fault. If a short-circuit does occur on one of the resistors R2 to R5, it will not affect the operation of the corresponding transistor but it can feed back on to any other transistor inputs which are connected to it a voltage which is too low to operate those transistor inputs and may therefore prevent conduction when this is required. In the systems herein described, this will affect no more than one transistor in any one NOR-gate, in effect applying a single spurious zero input to each affected NOR-gate. As hereinbefore explained, the NOR-gate outputs will not be affected by a fault of this kind occurring alone. A short circuit across the output resistors R1a and R1b would cause the output of the NOR-gate to represent a spurious one signal. This is made very unlikely by the use of two resistors in series. The circuit is designed so that the current drawn by any two of the transistors, flowing through the resistors R1a and R1b, will suffice to bring the voltage at the output to a level which will be recognised as a zero signal even if one of the resistors R1a or R1b has a short circuit fault. It follows that a spurious one signal can only arise if there are two concurrent failures.

FIG. 2 may also be taken as illustrating a preferred form of four-input NAND-gate for use in a system with redundancy of order two in which zero signals and one signals are respectively represented by a positive voltage and a voltage near ground potential. Analysis of the effects of possible faults in this case shows that an incorrect positive voltage signal on the output, representing now a spurious zero signal, can only arise if there are two or more concurrent failures, and that any single faults will either have no effect or will produce a spurious one signal which would be corrected by a subsequent NAND-gate in the system.

FIG. 3 will be used to illustrate the use of redundant NOR-gates of order two in a logical system.

FIG. 3(a) is a logical system for generating the exclusive OR function using non-redundant NOR-gates. FIG. 3(a) shows two single-input NOR-gates, or inverters, 30 and 31 and three two-input NOR-gates 32, 33, and 34. A first input 1 is applied to the NOR-gates 30 and 32 and a second input 2 is applied to the NOR-gates 31 and 32. The outputs of the NOR-gates 30 and 31 are applied to the inputs of the NOR-gate 33. The outputs of the NOR-gates 32 and 33 are connected to the inputs of the NOR-gate 34. The output from the circuit is taken from the NOR-gate 34.

From inspection of the circuit of FIG. 3(a), it will be seen that if the inputs 1 and 2 both carry a one signal, the outputs of both of the gates 30 and 31 will represent zero signals, the output from the gate 33 will represent a one signal and, therefore, the output from the gate 34 will represent a zero signal. If the inputs 1 and 2 both carry a zero signal, the output from the gate 32 will represent a one signal and, therefore, the output of the gate 34 will again represent a zero signal. However, if one of the inputs 1 and 2 carries a one signal and the other carries a zero signal, then the output of one of the gates 30 and 31 will represent a one signal. The output of the gate 33 will, therefore, represent a zero signal. Also the output of the gate 32 will represent a zero signal, so that the output of the gate 34 will represent a one signal. The circuit shown in FIG. 3(a), therefore, carries out the exclusive OR function.

FIG. 3(b) is a circuit diagram of a redundant circuit of order of 2 for carrying out the same function (exclusive OR) as the non-redundant circuit shown in FIG. 3(a). FIG. 3(b) shows a pair of two-input NOR-gates 30(a) and 30(b) replacing the NOR-gate 30 of FIG. 3(a). The gate 31 of FIG. 3(a) is replaced by two two-input NOR gates 31(a) and 31(b). The gates 32, 33, and 34 of FIG. 3(a) are replaced by pairs of four-input NOR-gates 32(a) and 32(b), 33(a) and 33(b), and 34(a) and 34(b) respectively. The input 1, consisting of two normally identical inputs 1(a) and 1(b), is applied to the pairs of gates 30(a), 30(b) and 32(a), 32(b). The input 2, consisting of two normally identical inputs 2(a) and 2(b), is applied to the pairs of gates 31(a), 31(b) and 32(a), 32(b). The outputs from the pairs of gates 30(a), 30(b) and 31(a) and 31(b) are applied to both of the pair of gates 33(a) and 33(b). The outputs from the pairs of gates 32(a), 32(b) and 33(a), 33(b) are applied to both of the pair of gates 34(a) and 34(b). The gates 34(a) and 34(b) provide two outputs 0(a) and 0(b) which should represent identical binary digits at the output 0.

It will be seen by inspection of FIG. 3(b) and by reference to FIG. 1, that the circuit shown in FIG. 3(b) will carry out the same exclusive OR function as the circuit shown in FIG. 3(a). Furthermore, if any NOR-gate of a pair of NOR-gates, other than the pair 34(a), 34(b), should fail so that its output represents a zero signal when it should represent a one signal, the circuit will still function correctly. Further, if one of the pairs of NOR-gates 34(a) and 34(b) should fail so as to yield a representation of a zero signal when it should carry a one signal, the outputs 0(a) and 0(b) will not agree. However, this should not effect the operation of subsequent similar redundant circuits driven from the replicate outputs 0(a) and 0(b).

FIG. 4 is a circuit diagram of an order three redundant circuit for achieving the same logical effect as the two-input NOR-gate shown in FIG. 1(a). FIG. 4 shows three six-input NOR-gates 40, 41 and 42. The two inputs 1 and 2 comprise sets of three normally identical inputs 1(a), 1(b), 1(c) and 2(a), 2(b), 2(c) respectively. Both sets of three inputs are applied to each of the NOR-gates 40, 41 and 42. The single outputs 0(a), 0(b) and (0c) of the NOR-gates 40, 41, and 42 provide a triplicate output 0. Inspection of the circuit will reveal that the output 0 should carry three one signals when, and only when, both of the inputs 1 and 2 represent zero signals. Further, it may be shown that the order three redundant circuit is even more reliable and resistant to faults than the order two redundant circuit shown in FIG. 1(b).

Order two and order three redundant circuits for achieving the same logical effect as a two-input NOR-gate have been hereinbefore described with reference to FIG. 1(b) and FIG. 4 respectively. The invention may, however, be extended to an order $r$ redundant circuit to obtain the same logical effect as a NOR-gate having $k$ inputs where $k$ is a positive integer and $r$ is a positive integer greater than unity. In this instance, the redundant circuit has $r$ NOR-gates each having $k.r$ inputs and one output. Each of the $k$ inputs is applied to each NOR-gate $r$ times. Each of the $r$ NOR-gates has an output so that the redundant circuit has $r$ outputs. If the redundant circuit has no faults, these $r$ outputs will all represent the same binary digit.

In the simplest case where $k=1$ and $r=2$, the redundant circuit will comprise two two-input NOR-gates as in the pair of NOR-gates 30(a) and 30(b) in FIG. 3(b), whereas if $k=2$ and $r=2$, the redundant circuit will comprise two four-input NOR-gates as in the case of the pair of NOR-gates 4 and 5 in FIG. 1(b).

The transistor circuit for each NOR-gate having $k.r$ inputs is similar to that shown in FIG. 2. However, in this instance there are $k.r$ transistors in parallel each having an input to its base *via* a resistor.

As hereinbefore suggested, the above-described redundant circuits for achieving the logical effects of NOR-gates can equally well be used to obtain the logical effects of NAND-gates. The redundant circuits of various orders and their inputs are the same for NAND-gates as for the NOR-gates hereinbefore described, NAND-gates being substituted for NOR-gates in, for example, FIGS. 1(b) and 4 to obtain the logical effect of the single two-input NAND-gate which would be obtained by substituting a NAND-gate for the NOR in FIG. 1(a). The preferred form of NAND-gate for such redundant circuits is as shown in FIG. 2. However, in this case, a positive voltage represents a zero signal while a voltage near zero (ground) represents a one signal. Thus, it will be seen, these voltages represent the opposite binary digits to those they represent when the circuit of FIG. 2 operates as a NOR gate.

Many logical systems for data processing, computing or process control applications, contain bistable elements as well as logical gates. It will now be shown, with reference to FIGS. 5a and 6a that such bistable elements can themselves be formed as combinations of logical gate circuits, and can therefore be made in redundant forms by combining redundant gates in accordance with the principles hereinbefore described. Some examples of redundant bistable combinations will then be given.

FIG. 5a shows a negatory gate 50 having only one input IP.1 and an output OP.1. It will be realised that single-input NAND-gate or a single-input NOR gate is a degenerate case and merely amounts to a simple inverter circuit.

FIG. 5b shows an arrangement of redundancy $r=2$, for performing the function of a simple inverter circuit such as is represented in FIG. 5a. In this arrangement duplicate inputs IP1/1 and IP1/2 are connected to the inputs of each of two two-input negatory gates 50/1 and 50/2, which provide duplicate outputs OP1/1 and OP1/2.

FIG. 6a shows schematically a non-redundant bistable formed by two single-input negatory gates 51 and 52, with cross-coupled feedback connections from the output OP.1 of gate 51 to the input IP.2 of gate 52 and from the output OP.2 of gate 52 to the input IP.1 of gate 51. This arrangement has two stable states; in one state there are one signals on the input IP.1 and the output OP.2, whereas in the other state there are one signals on the input IP.2 and the output OP.1. In order that it shall function properly it is essential to ensure that no signal sources are directly connected to either of the inputs IP.1 or IP.2 if they are such as might prevent the proper development of feedback signals on the input connections. It may also be noted that the action of the negatory gates produces an inversion of the signal on the corresponding output; that is to say, a one signal on the input IP.1 causes a zero signal on the corresponding output OP.1. This inversion may be considered a minor inconvenience.

One way to ensure that signal sources connected to the inputs shall not interfere with the actions of the bistable arrangement is to put a set of driving or buffer elements in series with the inputs, which will transform binary logic signals of one kind into an open-circuit condition. Such driving elements may also conveniently be arranged to produce an inversion of any logic signals of the other kind, thereby compensating for the inversion in the negatory gate. That is to say, each driving element may be arranged to respond to a one signal input by applying a zero signal to the associated negatory gate input, and to respond to a zero signal input by open-circuiting its connection to the associated negatory gate input. Sets of driving elements of this sort are indicated schematically in FIGS. 6b and 6c as boxes enclosing D/ and a number indicating their degree of redundancy. Redundant driving elements are provided to ensure that the reliability of the driving elements is at least as good as the reliability of the circuits which they connect. The driving elements should have a redundancy not less than the redundancy of the bistable circuits, so that their inclusion does not seriously degrade the overall reliability of the complete system. This redundancy may be achieved by parallel connections of an appropriate number of simple driving circuits.

Figure 1A:
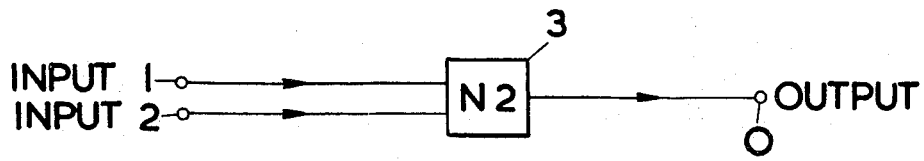
Figure 1B:
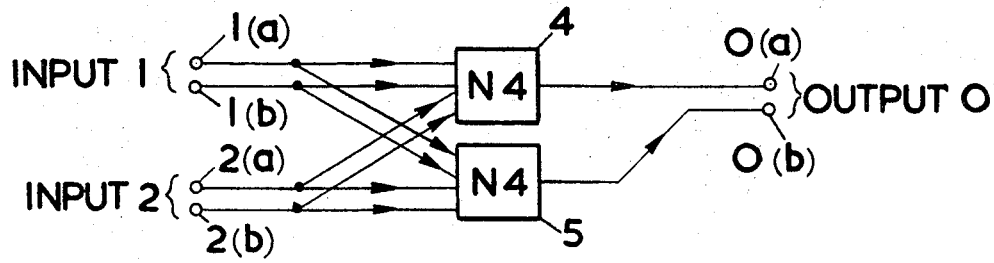
Figure 2:
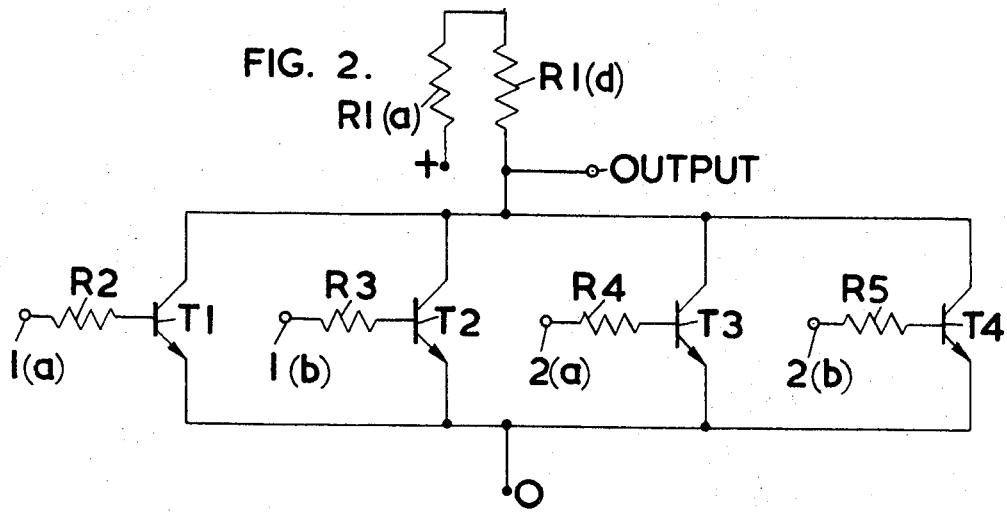
Figure 3A:
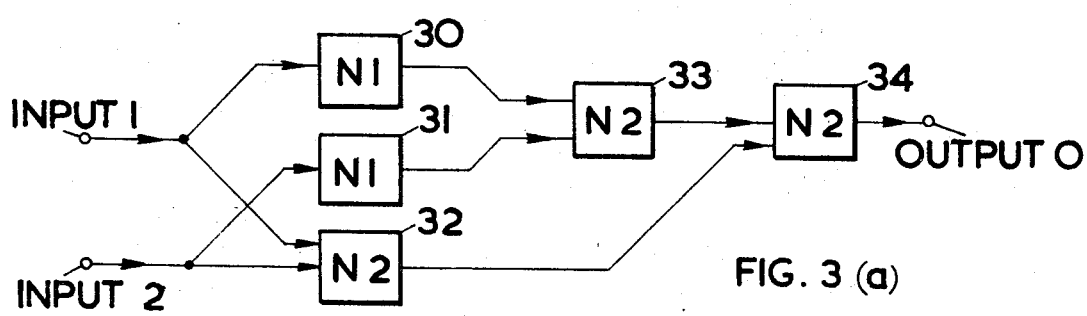
Figure 4:
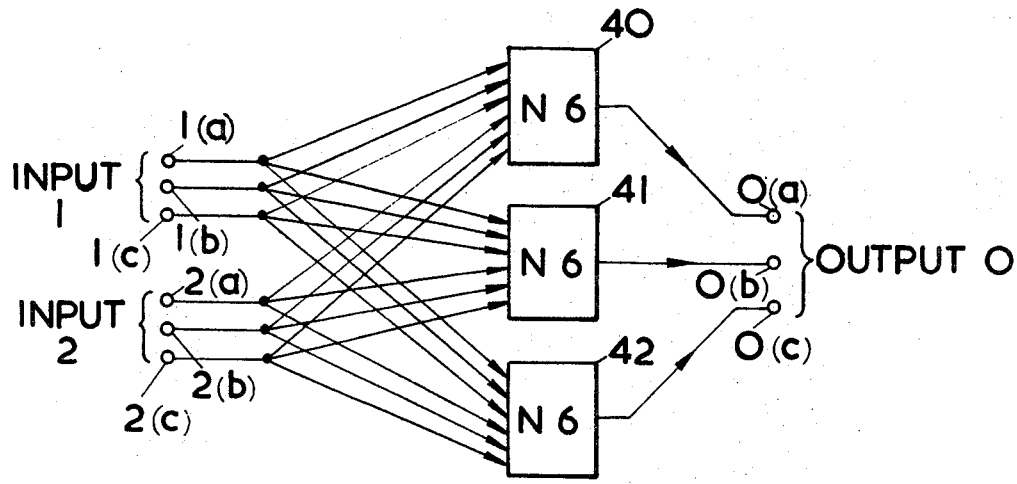
Figure 6B:
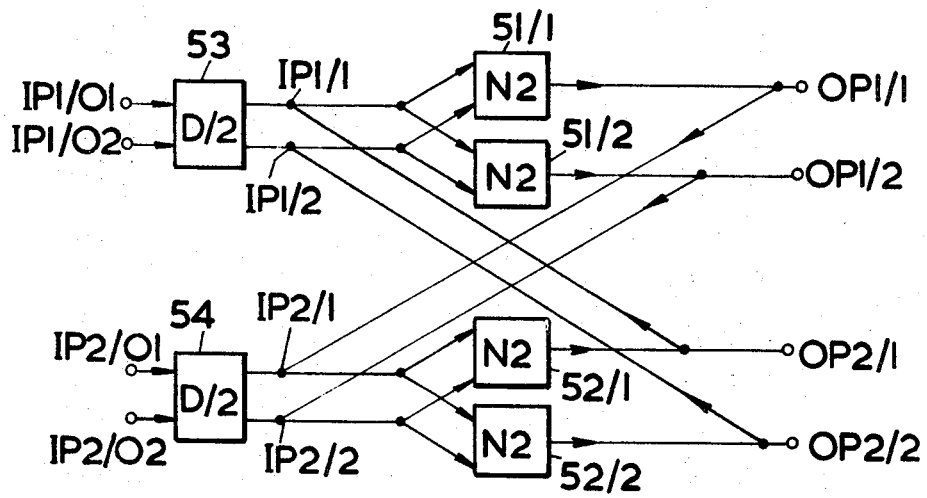
Figure 6:
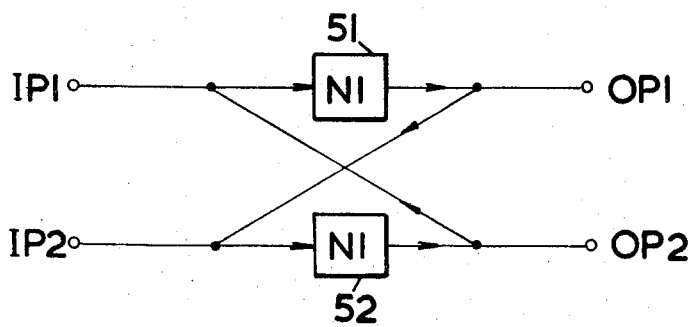

FIG. 6b shows a bistable arrangement of redundancy $r=2$ derived from the arrangement of FIG. 6a by providing duplicate inputs and replacing the single-input negatory gates 51 and 52 of FIG. 6a with redundant arrangements of the sort shown in FIG. 5b. Two negatory gates 51/1 and 51/2 each have two inputs connected to duplicate input connections IP.1/1 and IP.1/2, and two further negatory gates 52/1 and 51/2 each have two inputs connected to duplicate input connections IP.2/1 and IP.2/2. Cross-coupled feedback paths are provided, connecting the output OP.1/1 of the gate 51/1 to the input IP.2/1, the output OP.1/2 of the gate 51/2 to the input IP.2/2, the output OP.2/1 of the gate 52/1 to the input IP.1/1, and the output OP.2/2 of the gate 52/2 to the input IP.1/2 respectively. A set 53 of driving elements is connected between the inputs IP.1/1 and IP.1/2 of the negatory gates and replicate input lines IP.1/01 and IP.1/02. Similarly, a set 54 of driving elements is connected between the inputs IP.2/1 and IP.2/2 and replicate input lines IP.2/01 and IP.2/02.

Figure 6C:
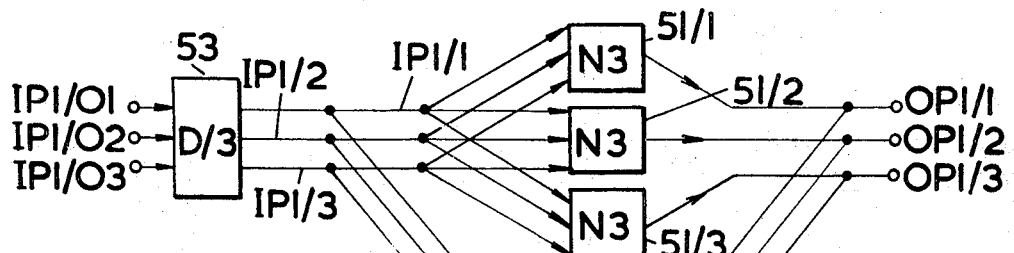

FIG. 6c shows a bistable arrangement of redundancy $r=3$, derived from the arrangement of FIG. 6a by providing triplicate inputs and replacing the single-input negatory gates 51 and 52 of FIG. 6a with redundant gate arrangements of redundancy $r=3$. There are three negatory gates 51/1, 51/2, and 51/3, each having three inputs connected to triplicate input connections IP.1/1, IP.1/2, and IP.1/3, and three further negatory gates 52/1, 52/2 and 52/3, each having three inputs connected to triplicate input connections IP.2/1, IP.2/2 and IP.2/3. The gates 51/1, 51/2 and 51/3 have output connections OP.1/1, OP.1/2 and OP.1/3 respectively. The gates 52/1, 52/2, and 52/3 have output connections OP.2/1, OP.2/2 and OP.2/3 respectively. Feedback paths connect OP.1/1 to IP.2/1, OP.1/2 to IP.2/2, OP.1/3 to IP.2/3, OP.2/1 to IP.1/1, OP.2/2 to IP.1/2, and OP.2/3 to IP.1/3. Sets of driving elements 53 and 54 are provided in series with the input connections.

Figure 7A:
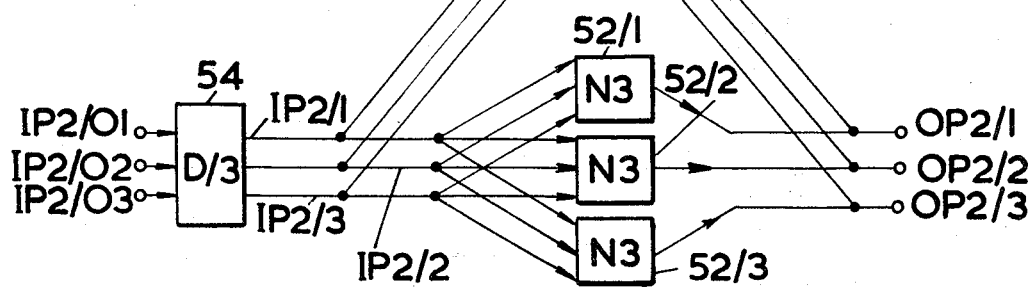
Figure 7A:
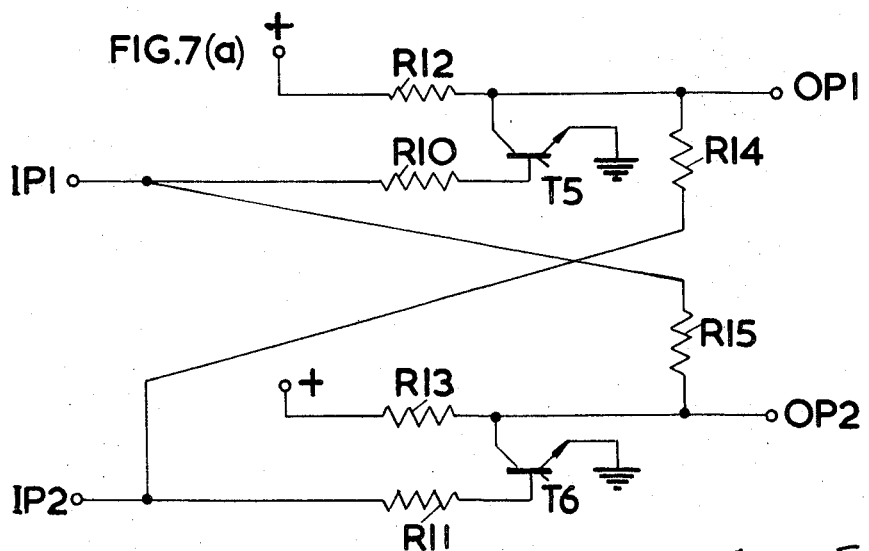
Figure 7B:
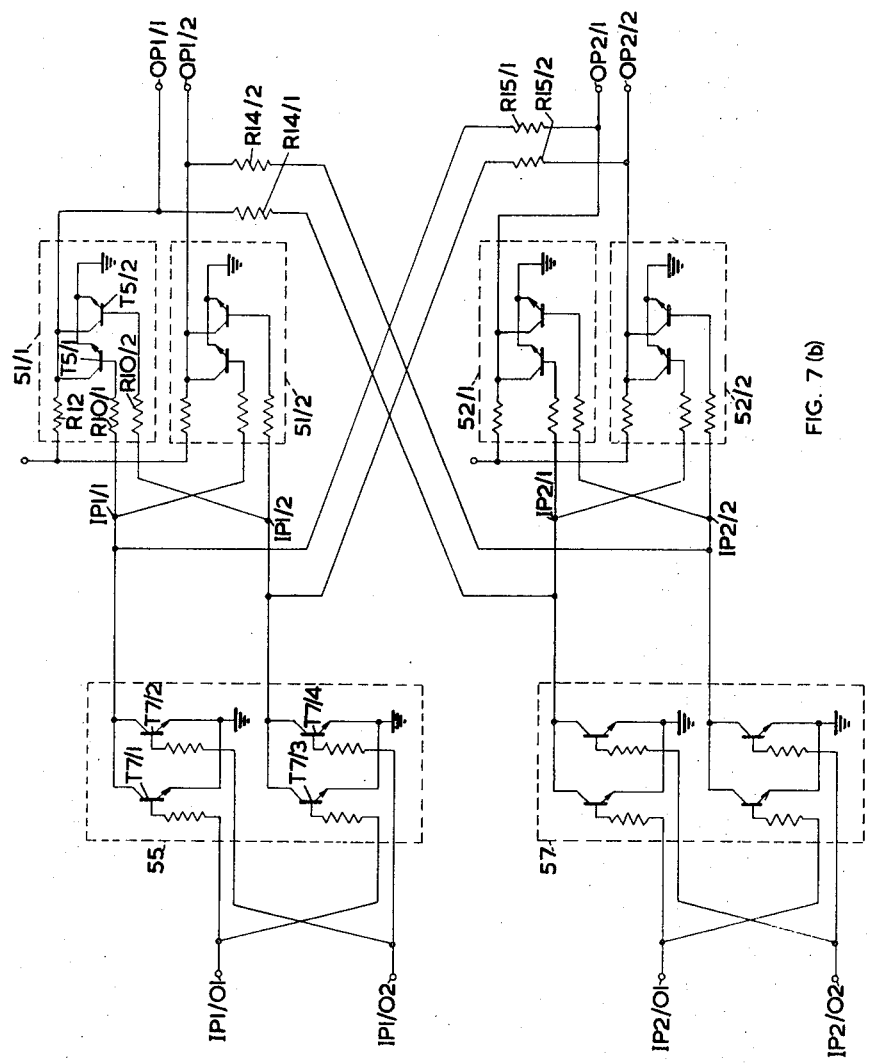

FIG. 7b shows a practical embodiment of the bistable element of FIG. 6a, in the form of an electrical circuit. This is a conventional non-redundant bistable circuit, redrawn to make clear its relationship with the more complex redundant circuit hereinafter described. It includes input connections IP.1 and IP.2 connected to the bases of npn transistors T.5 and T.6 by resistors R.10 and R.11 respectively. The emitters of the transistors T.5 and T.6 are grounded. A power supply positive voltage source is connected by resistors R.12 and R.13 respectively to the collectors of the transistors T.5 and T.6. The collector of the transistor T.5 is also connected directly to an output connection OP.1 and via a resistor R.14 to the input connection IP.2. The collector of the transistor T.6 is also connected directly to an output connection OP.2 and via a resistor R.15 to the input connection IP.1.

FIG. 7b shows a practical embodiment of the redundant bistable element of FIG. 6b in the form of an electrical circuit of redundancy $r=2$ derived from the circuit of FIG. 7a, with suitable driving circuits connected in series with each of its inputs. Inputs IP.1/1, IP1/2, IP.2/1, IP.2/2, gate circuits 51/1, 51/2, 52/1, and 52/2 and outputs OP.1/1, OP.1/2, OP.2/1, and OP.2/2 are provided and arranged as in FIG. 6b. The gate circuit 51/1 includes npn transistors T.5/1 and T.5/2 which have their bases connected to the inputs IP.1/1 and IP.1/2 by resistors R.10/1 and R.10/2 respectively, and their emitters grounded. The collectors of the transistors T.5/1 and T.5/2 are both connected directly to the output OP.1/1 and through a resistor R.12 to a power supply positive voltage connection. The gate circuits 51/2, 52/1, and 52/2 have an exactly similar structure. The outputs OP.1/1 and OP.1/2 are connected to the inputs IP.2/1 and IP.2/2 by resistors R.14/1 and R.14/2 respectively. The outputs OP.2/1 and OP.2/2 are connected to the inputs IP.1/1 and IP.1/2 by resistors R.15/1 and R.15/2 respectively.

A driving circuit 55 includes four npn transistors T.7/1, T.7/2, T.7/3, and T.7/4. The transistors T.7/1 and T.7/2 have their emitters grounded and their collectors connected to the input IP.1/1 of the gate circuit 51/1. The transistors T.7/3 and T.7/4 have their emitters grounded and their collectors connected to the input IP.1/2 of the gate circuit 51/2. The bases of the transistors T.7/1 and T.7/3 are connected by separate resistors to an input line IP.1/01 and the bases of the transistors T.7/2 and T.7/4 are connected by separate resistors to an input line IP.1/02. The input lines IP.1/01 and IP.1/02 are replicates. Another driving circuit 57, which is similar to the circuit 55, is similarly connected between the inputs IP.2/1 and IP.2/2 of the gates 52/1 and 52/2 and replicate inputs IP.2/01 and IP.2/02.

The circuit of FIG. 7b is used in a system in which a positive voltage close to the power supply positive voltage represents a one signal and a voltage close to ground potential represents a zero signal, and its operation will now be described. A one signal applied to the input IP.1/01 should make the transistors T.7/1 and T.7/3 conductive, so that the inputs IP.1/1 and IP.1/2 are brought down to a voltage near ground. The transistors in the gate circuits 51/1 and 51/2 should therefore all be non-conductive and the outputs OP.1/1 and OP.1/2 should be at or near the positive supply voltage. At the same time the inputs IP.2/01 and IP.2/02 should be receiving zero signals; that is to say they should be close to ground potential. The transistors of the driving circuits 57 should therefore be non-conductive, effectively open-circuiting their connections to the inputs IP.2/1 and IP.2/2. In the absence of any faults, the positive voltage on the outputs OP.1/1 and OP.1/2 is transmitted via the resistors R.14/1 and R.14/2 and causes the transistors of the gate circuits 52/1 and 52/2 to conduct. The outputs OP.2/1 and OP.2/2 are consequently brought down to a voltage near ground potential.

In the absence of faults, when it is desired to change the bistable circuit from the state described in the preceding paragraph to its other state, zero signals are applied to the inputs IP.1/01 and IP.1/02 and one signals are applied to the inputs IP.2/01 and IP.2/02. The transistors of the driving circuit 57 should therefore become conductive, while the transistors of the gates 52/1 and 52/2 and of the driving circuit 55 should cease conducting. The voltages of the inputs IP.2/1 and IP.2/2 should be brought down to ground, while the voltages of the outputs OP.2/1 and OP.2/2 should rise. These voltages should be transmitted through the feedback paths to make the transistors of the gates 51/1 and 51/2 conduct.

The bistable arrangement still operates satisfactorily if a single one of the driving circuit inputs, for instance IP.2/01, receives a spurious zero signal in place of a one signal, as a result of a fault. The fault merely causes the driving circuit to be open-circuited; the gates 52/1 and 52/2 are made to operate by the signal from the other input IP.2/02 of the pair, and the input IP.2/1 is brought to the zero level through the action af the feedback paths. Any single occurrence of a spurious one input signal is also corrected, because it will only prevent one of the transistors in each of the associated gates from conducting; the other transistors will conduct as they ought and will operate subsequent circuits satisfactorily.

The effects of faults occurring singly within the circuits of FIG. 7b, in the absence of any faults in the signals applied to it, will now be considered. If any one transistor should become open-circuited by a fault, the transistor paired with it will conduct when required, so that the fault will have no effect. This is true of the transistors in the gate circuits as well as the transistors in the driving circuits. A short-circuited transistor in one of the driving circuits will hold one transistor in each gate non-conducting, but the other transistors will operate the gates to produce the correct outputs. A short-circuited transistor in one of the gate circuits will ground one of the outputs so that it produces a spurious zero signal, for instance a short-circuit fault in the transistor T.7/1 will ground the output OP.1/1 and may act through the feedback connection to hold one transistor in each of the gate circuits 52/1 and 52/2 non-conducting; however the other transistors will suffice to operate these gate circuits and the outputs OP.1/2, OP.2/1 and OP.2/2 should be correct. If the outputs OP.1/1 and OP.1/2 are arranged to drive duplicate inputs of another circuit of the type herein described, or duplicate apparatus, or to drive a reliable apparatus through a reliable OR-gate, then the spurious zero signal on the output OP.1/1 will not matter.

In order to reduce the power required to operate a transistorised logical system, gate circuits and bistable circuits including complementary pairs of transistors may be used. The present invention is also applicable to systems of this kind; a redundant bistable circuit will be described by way of example.

Figure 8:
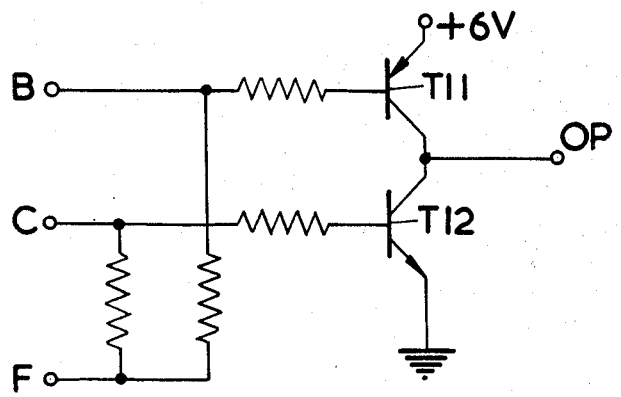

FIG. 8 shows a simple, non-redundant, NOR-gate circuit including a pnp transistor T11 and an npn transistor T12. The bases of the transistors T11 and T12 are connected to input connections B and C respectively, by separate resistors. The input connections B and C are also connected by separate resistors to a common input F. The collectors of the transistors T11 and T12 are connected to an output connection OP. A power supply positive terminal is connected to the emitter of the transistor T11, while the emitter of the transistor T12 is grounded. The input connections B and C are normally connected by separate capacitors (not shown) to a common input. A positive pulse applied to the connections B and C, or a positive voltage applied to the connection F, will tend to make the transistor T12 more conductive than the transistor T11, so that the voltage on the output OP falls. Conversely, a negative pulse applied to the connections B and C, or a voltage near ground potential applied to the connection F, will tend to make the transistor T11 more conductive than the transistor T12, causing the voltage on the output OP to rise. Thus the circuit of FIG. 8 acts as a single-input NOR-gate or inverter, and a pair of such circuits can be inter-connected as in FIG. 6(a) to form a non-redundant bistable circuit. A circuit so formed is shown in FIG. 9(a); this is a known circuit, although it is commonly drawn in another form which, at first sight, appears considerably different.

Figure 9A:
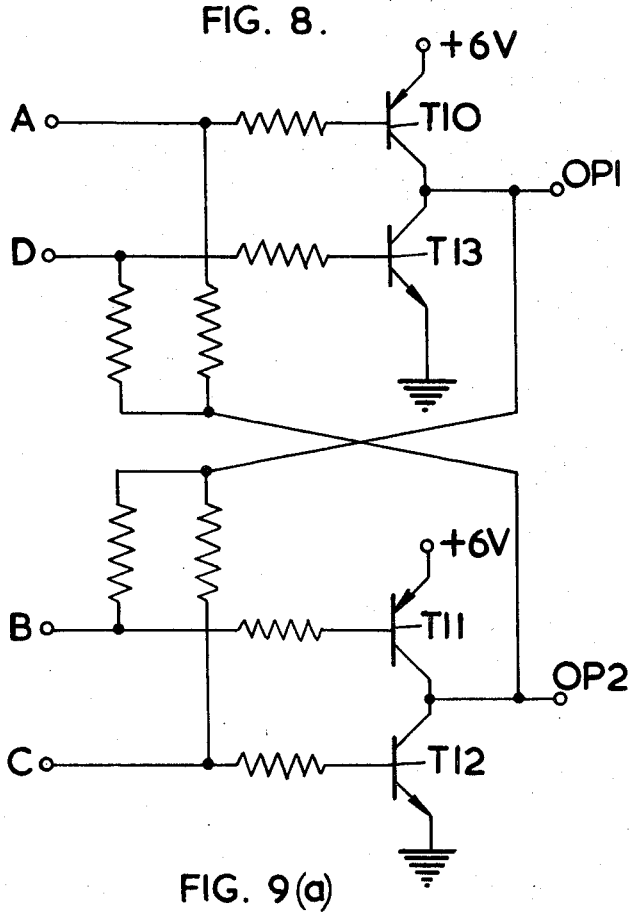

In FIG. 9(a) a first gate circuit includes a pnp transistor T10 and an npn transistor T13 with their bases connected by separate resistors to input connections A and D respectively. A second gate circuit includes a pnp transistor T11 and an npn transistor T12 with their bases connected by separate resistors to input connections B and C respectively. The collectors of the transistors T10 and T13 are connected to an output connection OP1, which is connected by separate resistors to the input connections B and C. The collectors of the transistors T11 and T12 are connected to an output connection OP2, which is connected by separate resistors to the input connections A and D. The transistors T10 and T11 have their emitters connected to positive voltage power supply connections, while the transistors T12 and T13 have their emitters grounded.

The input connections A, B, C, and D are normally connected through separate capacitors (one to each input connection, not shown) to a common input, which is pulsed to change the state of the circuit. In one state the transistors T.10 and T.12 conduct while the transistors T.11 and T.13 do not; in the other state the transistors T.11 and T.13 conduct while the transistors T.10 and T.12 are non-conductive.

Figure 9B:
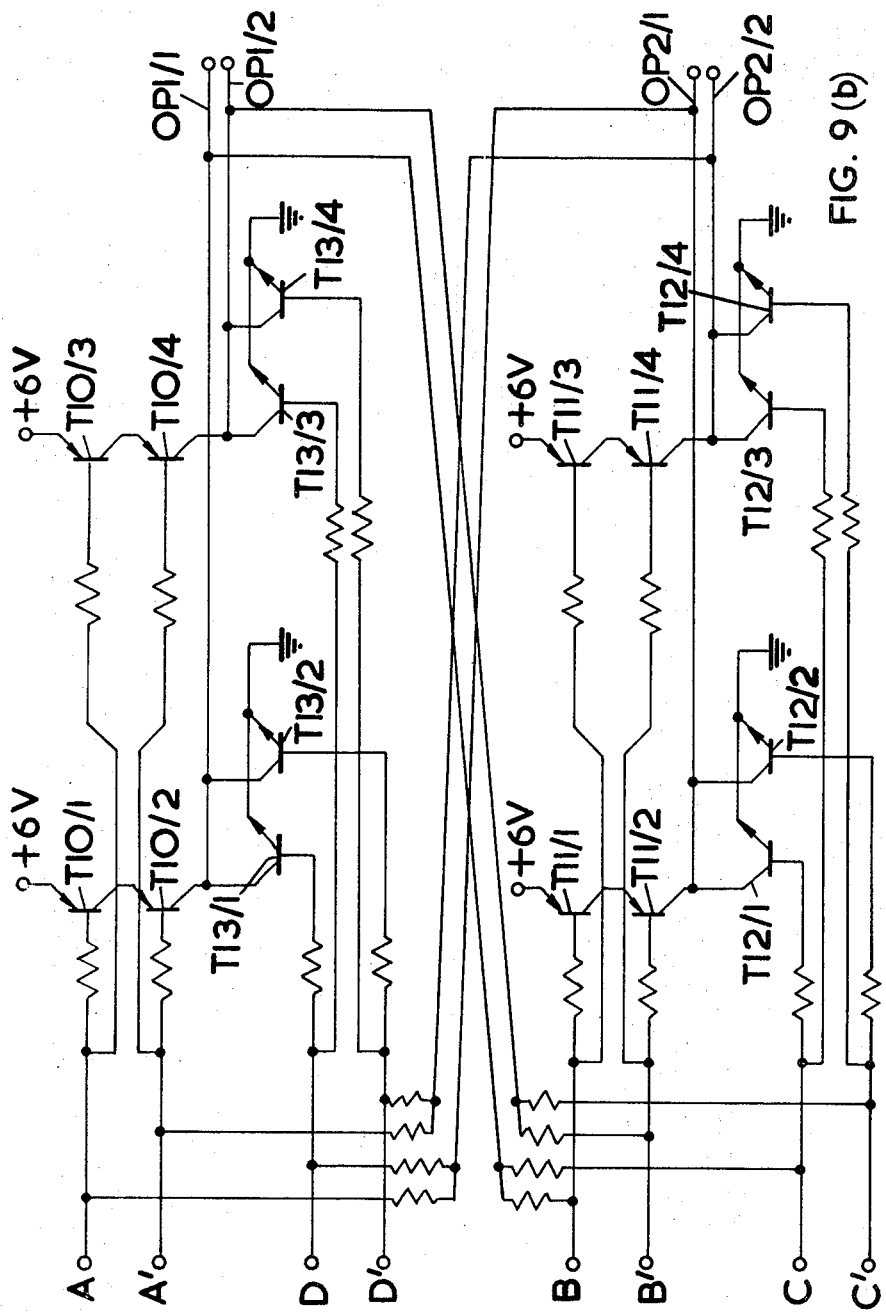

FIG. 9b shows a redundant form of the circuit of FIG. 9a. The transistor T.10 of FIG. 9a is replaced by two similar transistors T.10/1 and T.10/2 in series, and the transistor T.11 is similarly replaced by transistors T.11/1 and T.11/2 in series. The transistors T.12 and T.13 of FIG. 9a are, however, replaced by parallel pairs of transistors T.12/1, T.12/2 and T.13/2 respectively. The whole of the modified circuit is then duplicated, by a similar circuit including transistors T.10/3, T.10/4, T.11/3, T.11/4, T.12/3, T.12/4, T.13/3, and T.13/4, connected to replicate input connections A', B', C', and D' and providing replicate complementary outputs OP1/2 and OP2/2. The added transistors T.10/2 and T.11/2 have their bases connected by separate resistors to the replicate inputs A' and B' respectively; the bases of the transistors T.10/4 and T.11/4 are correspondingly connected by separate resistors to the inputs A' and B'. The bases of the added transistors T.12/2 and T.13/2 are connected by separate resistors to the replicate inputs C' and D' respectively, and the bases of the transistors T.12/4 and T.13/4 are correspondingly connected by separate resistors to the inputs C' and D'.

The circuit of FIG. 9b illustrates an application of the hereinbefore stated principles concerning the choice of series or parallel arrangements in the derivation of redundant circuits. The transistors T.10/1 and T.10/2 are connected in series so that the failure of either of them can only cause a spurious zero signal; a spurious one signal can only result from a combination of two simultaneous failures. The transistors T.13/1 and T.13/2 have to be placed in parallel to achieve the same result. It should be noted that the circuit of FIG. 9b is for use in a system in which a positive voltage represents a one signal and a voltage near ground represents a zero signal.

I claim:
1. A redundant binary-logic circuit for achieving, with a redundancy of order $r$ where $r$ is a positive integer greater than unity, a logical effect corresponding to that of a non-redundant negatory gate having one output and $k$ separate inputs where $k$ is any positive integer; the said circuit comprising:

$r$ replicates of each of the said $k$ separate inputs, thus forming a total of $k$ times $r$ input connections, and $r$ negatory gates of the same class, each having one output and $k$ times $r$ inputs and each constructed to produce a first type of binary signal only when each and every one of its inputs receives the complementary type of binary signal and constructed so that a fault or component failure within it may produce a false signal of one kind at its output but the chance of any single fault or failure within it causing a false signal of the converse kind at its output is remote or substantially nil, the outputs of the said $r$ negatory gates being sufficiently independent of each other to ensure that if a false signal is developed on any one of the said outputs, it will not be transmitted to any other one of the said outputs, and each of the said $r$ negatory gates having its said $k$ times $r$ inputs separately connected to the said $k$ times $r$ input connections.

2. A redundant binary-logic circuit as claimed in claim 1 and wherein $r$ equals two.

3. A redundant binary-logic circuit as claimed in claim 1 and wherein $r$ equals three.

4. A redundant bistable binary-logic circuit, comprising a first binary-logic circuit as claimed in claim 1 with $k$ equal to unity, a second binary-logic circuit as claimed in claim 1 with $k$ equal to unity and constructed to operate in the same manner as the said first binary logic circuit, $r$ separate feedback paths connecting the $r$ outputs of the first binary-logic circuit to the $r$ replicate inputs of the second binary-logic circuit and $r$ separate feedback paths connecting the $r$ outputs of the second binary-logic circuit to the $r$ replicate inputs of the first binary-logic circuit.

5. A redundant bistable binary-logic circuit as claimed in claim 4 and wherein each negatory gate of the first binary-logic circuit and each negatory gate of the second binary-logic circuit comprises $r$ transistors of one conductivity type having their emitter-to-collector current paths connected in series between a power supply connection and the output of the gate, $r$ transistors of the opposite conductivity type having their collector-to-emitter current paths connected in parallel between the output of the gate and a power supply connection, and 2r separate resistive paths connecting the bases of the transistors to replicate feedback connections.

6. A redundant bistable binary-logic circuit as claimed in claim 4 and comprising a first driving-means connected in series with the replicate inputs of the first binary-logic circuit and a second driving-means connected in series with the replicate inputs of the second binary-logic circuit, the said first driving-means and the said second driving-means each having r replicate inputs and r replicate outputs, and being responsive to one signals on its inputs to provide zero signals on its outputs, and being responsive to zero signals on its inputs to render open-circuit the paths to its outputs.

7. A redundant bistable binary-logic circuit as claimed in claim 4 and wherein the negatory gates of the first binary-logic circuit and the negatory gates of the second binary-logic circuit each comprise r transistors with their emitters all connected to a common power supply connection, their collectors connected to the output of the gate, and their bases connected by separate resistors to the inputs of the gate.

8. A redundant bistable binary-logic circuit as claimed in claim 7 and comprising first driving-means having r outputs separately connected to the inputs of the first binary-logic circuit and having r inputs, and second driving-means having r outputs separately connected to the inputs of the second binary-logic circuit and having r inputs and wherein the said first driving-means and the said second driving-means each comprise an r by r matrix of transistors all with their emitters connected to a common power supply connection, each row of transistors in the matrix having their collectors all connected to a separate one of the outputs of the driving-means, and separate resistors connecting each input of the driving-means to the bases of all the transistors in an associated column of the matrix.

9. A redundant binary-logic system comprising at least one binary-logic circuit as claimed in claim 1 and a plurality of NOR-gate circuits connected to receive signals from the outputs of the r negatory gates in the said at least one binary-logic circuit, the said r negatory gates each being constructed so that a fault or component failure within it may feed a zero signal to one of the said NOR-gates but the chance of any single fault or failure within it applying a false one signal to any of the said NOR-gates is remote or substantially nil.

10. A redundant binary-logic system comprising at least one binary-logic circuit as claimed in claim 1 and a plurality of NAND-gate circuits connected to receive signals from the outputs of the r negatory gates in the said at least one binary-logic circuit, the said r negatory gates each being constructed so that a fault or component failure within it may feed a false one signal to one of the said NAND-gates but the chance of any single fault or failure within it applying a false zero signal to any of the said NAND-gates is remote or substantially nil.

11. A redundant binary-logic circuit as claimed in claim 1 and wherein each of the said r negatory gates of the same class comprises an output connection, a first group of r transistors of one conductivity type with their emitter-to-collector current paths connected in parallel with each other and connected at one side to the output connection and at the other side to a power supply connection, r inputs separately connected through resistors to the bases of the said first group of r transistors, and a second group of r transistors of the conductivity type opposite to that of the transistors of the first group, the said second group of transistors having their emitter-to-collector current paths connected to form a series chain connected at one end of the chain to the output connection and at the other end of the chain to another power supply connection and having their bases separately connected through resistors to the said r inputs.

12. A redundant binary-logic circuit as claimed in claim 1 and wherein each of the said r negatory gates of the same class comprises an output connection, k times r switch devices connected in parallel with each other and connected at one side to the output connection and at the other side to a power supply connection, k times r inputs separately connected to the said switch devices, and r resistances connected in a series chain connected at one end of the series chain to the output connection and at the other end of the chain to another power supply connection.

13. A redundant binary-logic circuit as claimed in claim 12 and wherein the switch devices are transistors and the resistances are electrical resistors.

14. A redundant binary-logic circuit as claimed in claim 1, wherein the said r negatory gates are NOR-gates, each having one output and k times r inputs and each constructed to produce a 1 signal only when each and every one of its inputs receives a 0 signal, and constructed so that a fault or component failure within it may produce a false 0 signal at its output but the chance of any single fault or failure within it causing a false 1 signal at its output is remote or substantially nil.

15. A redundant binary-logic circuit as claimed in claim 14 and wherein r similar components are connected in series in a part of the said circuit where concurrent short-circuit failures of the said r similar components would produce a spurious one signal at its output.

16. A redundant binary-logic circuit as claimed in claim 14 and wherein r similar components are connected in parallel in a part of the said circuit where concurrent open-circuit failures of the said r similar components would produce a spurious one signal at its output.

17. A redundant binary-logic system, comprising a plurality of groups of components operatively interconnected and forming inter alia at least one redundant binary-logic circuit as claimed in claim 14, and wherein, at every place in the system where a short-circuit failure of one of the said groups of components would tend to feed a spurious one signal to one of the NOR-gates of the system, the said one of the said groups comprises r similar components in series.

18. A redundant binary-logic system, comprising a plurality of groups of components operatively interconnected and forming inter alia at least one redundant binary-logic circuit as claimed in claim 14 and wherein, at every place in the system where an open-circuit failure of one of the said groups of components would tend to feed a spurious one signal to one of the NOR-gates of the system, the said one of the said groups comprises r similar components connected in parallel.

19. A redundant binary-logic circuit as claimed in claim 1, wherein the said r negatory gates are NAND-gates, each having one output and k times r inputs and each constructed to produce a 0 signal only when each and every one of its inputs receives a 1 signal, and constructed so that a fault or component failure within it may produce a false 1 signal at its output but the chance of any single fault or failure within it causing a false 0 signal at its output is remote or substantially nil.

20. A redundant binary-logic circuit as claimed in claim 19 and wherein r similar components are connected in series in a part of the said circuit where concurrent short-circuit failures of the said r similar components would produce a spurious zero signal at its output.

21. A redundant binary-logic circuit as claimed in claim 19 and wherein r similar components are connected in parallel in a part of the said circuit where concurrent open-circuit failures of the said r similar components would produce a spurious zero signal at its output.

22. A redundant binary-logic system, comprising a plurality of groups of components operatively interconnected and forming inter alia at least one redundant binary-logic circuit as claimed in claim 17 and wherein, at every place in the system where a short-circuit failure of one of the said groups of components would tend to feed a spurious zero signal to one of the NAND-gates of the system, the said one of the said groups comprises $r$ similar components connected in series.

23. A redundant binary-logic system, comprising a plurality of groups of components operatively interconnected and forming inter alia at least one redundant binary-logic circuit as claimed in claim 14 and wherein, at every place in the system where an open-circuit failure of one of the said groups of components would tend to feed a spurious zero signal to one of the NAND-gates of the system, the said one of the said groups comprises $r$ similar components connected in parallel.

24. A redundant binary-logic circuit for achieving, with a redundancy of order $r$ where $r$ is a positive integer greater than unity, a logical effect corresponding to that of a non-redundant negatory gate having one output and $k$ separate inputs where $k$ is any positive integer; the said circuit comprising:

$r$ replicates of each of the said $k$ separate inputs, thus forming a total of $k$ times $r$ input connections, and $r$ negatory gates of the same class, each having $k$ times $r$ inputs separately connected to the said $k$ times $r$ input connections, and each having one output, thereby providing a total of $r$ separate outputs which are sufficiently isolated from each other to ensure that if a false signal is developed on any one of the said outputs, it will not be transmitted to any other one of the said outputs;

each of the said $r$ negatory gates being constructed to produce a first type of binary signal at its output only when each and every one of its inputs receives the complementary type of binary signal, and comprising:

a first power supply connection, a resistance connected at one end to the said first power supply connection and at its other end to the said output, a second power supply connection, and $k$ times $r$ switch devices each having a control input and a main current path, the said $k$ times $r$ switch devices having their control inputs separately connected to the said $k$ times $r$ inputs and having their main current paths all connected in parallel, main current path being connected at one end to the said second power supply connection and at its other end to the said output.

References Cited

UNITED STATES PATENTS

| | | | |
|---|---|---|---|
| 2,910,584 | 10/1959 | Steele | 307—204 |
| 3,134,032 | 5/1964 | Mann | 307—204 |
| 3,283,169 | 11/1966 | Libaw | 307—204 |
| 3,305,830 | 2/1967 | Constantine | 307—204 |

OTHER REFERENCES

Electronics, Apr. 12, 1963, pp. 62–66; "Basic Rules for Designing Reliability Into Semiconductor Circuits," by K. L. Hall.

DONALD D. FORRER, Primary Examiner

H. A. DIXON, Assistant Examiner

U.S. Cl. X.R.

307—215